United States Patent
Hattori et al.

(10) Patent No.: US 10,128,469 B2
(45) Date of Patent: Nov. 13, 2018

(54) SQUARE-SHAPED SEALED SECONDARY BATTERY AND METHOD OF MANUFACTURING SAME

(75) Inventors: Takayuki Hattori, Hyogo (JP); Yasuhiro Yamauchi, Hyogo (JP); Toshiyuki Nohma, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 1284 days.

(21) Appl. No.: 14/343,365

(22) PCT Filed: Sep. 3, 2012

(86) PCT No.: PCT/JP2012/072352
§ 371 (c)(1),
(2), (4) Date: Jul. 3, 2014

(87) PCT Pub. No.: WO2013/035668
PCT Pub. Date: Mar. 14, 2013

(65) Prior Publication Data
US 2014/0308555 A1 Oct. 16, 2014

(30) Foreign Application Priority Data
Sep. 9, 2011 (JP) ................................. 2011-197589

(51) Int. Cl.
*H01M 2/02* (2006.01)
*H01M 10/04* (2006.01)
(Continued)

(52) U.S. Cl.
CPC ............ *H01M 2/02* (2013.01); *H01M 2/024* (2013.01); *H01M 2/0217* (2013.01);
(Continued)

(58) Field of Classification Search
None
See application file for complete search history.

(56) References Cited

U.S. PATENT DOCUMENTS

2010/0086847 A1 4/2010 Kwak
2010/0203373 A1* 8/2010 Kawase ............ H01M 2/0262
429/94
(Continued)

FOREIGN PATENT DOCUMENTS

CN 101714644 A 5/2010
CN 101765931 A 6/2010
(Continued)

OTHER PUBLICATIONS

Machine Translation of JP 2009-170137 A, dated Jul. 30, 2009, retrieved Aug. 10, 2017.*
(Continued)

*Primary Examiner* — Maria Laios
*Assistant Examiner* — Robert S Carrico
(74) *Attorney, Agent, or Firm* — Westerman, Hattori, Daniels & Adrian, LLP (57) ABSTRACT

In a prismatic sealed secondary battery provided with an outer can made of a metal, the ability of inserting the electrode assembly into the outer can is improved to restrain the displacement and damages of the insulation member when inserting the electrode assembly into the outer can. The prismatic sealed secondary battery of the present invention includes an insulation member having a bottomed box shape which is a shape obtained by eliminating the upper surface from the surfaces of a hexahedron having a cuboid form, wherein each width of at least a pair of side surfaces facing each other in the insulation member is smaller than the width of the electrode assembly facing the pair of side surfaces.

16 Claims, 6 Drawing Sheets

(51) Int. Cl.
    *H01M 10/0587*     (2010.01)
    *H01M 10/052*     (2010.01)

(52) U.S. Cl.
    CPC ....... *H01M 2/0275* (2013.01); *H01M 2/0277* (2013.01); *H01M 10/0431* (2013.01); *H01M 10/052* (2013.01); *H01M 10/0587* (2013.01); *Y10T 29/4911* (2015.01)

(56) References Cited

U.S. PATENT DOCUMENTS

| | | | |
|---|---|---|---|
| 2010/0209750 A1 | 8/2010 | Nagamatsu et al. | |
| 2011/0059344 A1 | 3/2011 | Kawase | |
| 2011/0183181 A1 | 7/2011 | Moon | |
| 2011/0236750 A1* | 9/2011 | Kohno | H01M 2/0404 |
| | | | 429/181 |

FOREIGN PATENT DOCUMENTS

| | | |
|---|---|---|
| CN | 101978547 A | 2/2011 |
| CN | 102136564 A | 7/2011 |
| EP | 2175506 A2 | 4/2010 |
| EP | 2192637 A1 | 6/2010 |
| EP | 2355202 A1 | 8/2011 |
| JP | 2002-184364 A | 6/2002 |
| JP | 2002-298792 A | 10/2002 |
| JP | 2003-077524 A | 3/2003 |
| JP | 2006-278245 A | 10/2006 |
| JP | 2009-026704 A | 2/2009 |
| JP | 2009-048966 A | 3/2009 |
| JP | 2009-170137 A | 7/2009 |
| JP | 2009-277443 A | 11/2009 |
| JP | 2010-092853 A | 4/2010 |
| JP | 2011-155001 A | 8/2011 |
| KR | 2010-0039746 A | 4/2010 |
| KR | 2011-0005852 A | 1/2011 |
| KR | 10-1036089 B1 | 5/2011 |
| WO | 20091025199 A1 | 2/2009 |
| WO | 20091139251 A1 | 11/2009 |

OTHER PUBLICATIONS

International Search Report of PCT/JP2012/072352, dated Nov. 20, 2012.

Office Action dated May 27, 2016, issued in Japanese Patent Application No. 2013-532581 (5 pages).

* cited by examiner

SQUARE-SHAPED SEALED SECONDARY BATTERY AND METHOD OF MANUFACTURING SAME

TECHNICAL FIELD

The present invention relates to a prismatic sealed secondary battery, and, particularly, to a prismatic sealed secondary battery provided with an electrode accommodated in an insulation member and prismatic outer body, and to a method for producing the prismatic sealed secondary battery.

BACKGROUND ART

Secondary batteries such as lithium ion secondary batteries and nickel metal-hydride secondary batteries are, nowadays, widely used as driving power sources for portable electronic devices such as mobile telephones, portable personal computers, and portable music players or as power sources for hybrid electric vehicles (HEVs and PHEVs), and electric vehicles (EVs).

These secondary batteries are more desired to have a square form than a cylindrical form particularly when space efficiency is demanded. Moreover, a metal case is generally used as the outer body of a battery when physical strength is required.

A prismatic sealed secondary battery, for example, a prismatic nonaqueous electrolyte secondary battery is manufactured in the following manner. Specifically, a negative active material compound containing a negative active material is applied to each surface of a negative electrode substrate (current collector) made of a narrow sheet-like copper foil to manufacture a negative electrode plate. Also, a positive active material compound containing a positive active material is applied to each surface of a positive electrode substrate (current collector) made of a narrow sheet-like aluminum foil to manufacture a positive electrode plate.

Then, the negative electrode plate and the positive electrode plate are laminated on each other by interposing a separator made of, for example, a microporous polyethylene film between the both and spirally wound around a cylindrical winding core in the condition that the negative electrode plate and the positive electrode plate are insulated from each other to manufacture a cylindrical winding electrode assembly.

Then, this cylindrical winding electrode assembly is pressed by a press machine to form the electrode into such a flat winding electrode assembly that the electrode assembly can be inserted into a prismatic battery outer body and then, accommodated in the prismatic outer body. Then, an opening except for an electrolyte pour hole in the battery outer body is closed, an electrolyte is injected into the outer body, and finally, the electrolyte pour hole is closed to make a prismatic nonaqueous electrolyte secondary battery.

When a metal case is adopted as the outer body, the electrode is accommodated in a metal case (hereinafter referred to as "outer can") which is an outer body after the above flat winding electrode assembly is wrapped with an insulation member for insulating the electrode from the case to thereby manufacture a prismatic nonaqueous electrolyte secondary battery.

As an example of a prismatic secondary battery in which a flat winding electrode assembly is accommodated in an outer can in the condition that it is wrapped with an insulation member, the following Patent Literature 1 discloses an invention of a prismatic battery most suitable for EV or HEV use because it is resistant to damages to the surface of a flat electrode assembly in the process of inserting the electrode into a prismatic metal outer can in the production of the battery and can be also charged/discharged under a large current though the positive electrode plate and negative electrode plate are electrically insulated from the prismatic metal battery outer can.

In a conventional prismatic secondary battery as disclosed in the following Patent Literature 1, the insulation sheet is cut into a predetermined shape, then, folded and formed into a predetermined form (hereinafter, the insulation sheet formed into a predetermined form is referred to as "box-shaped insulation sheet") and usually into a cuboid form for use as a box-shaped insulation sheet.

CITATION LIST

Patent Literatures

Patent Literature 1: JP 2009-170137 A
Patent Literature 2: JP 2009-277443 A

SUMMARY OF INVENTION

Technical Problem

However, such a conventional box-shaped insulation sheet mentioned above has the problem that its corners tend to interfere with the outer can when inserted into the outer can and has a difficulty in insertion into the outer can. There is a fear that the corners of the insulation sheet are caught in the outer can, so that the insulation sheet is, for example, positionally displaced or broken, causing insulation inferior. It is necessary to reduce the interference between the insulation sheet and the outer can in the production process as mentioned above to reduce the risk of development of internal short circuits between the electrode assembly and the outer can.

As an example of the technique used to improve the ability to insert the electrode assembly covered with the insulation sheet by devising the shape of the box-shaped insulation sheet with the intention of reducing the interference between the insulation sheet and the outer can, the invention of a prismatic battery disclosed in the above Patent Literature 2 is given.

The prismatic battery described in the above Patent Literature 2 is characterized by the feature that it is a prismatic battery provided with an electrode assembly having a flat shape and a box-shaped battery case in which the electrode assembly is to be accommodated. The center portion in a predetermined direction as viewed from a broad width surface in the electrode assembly forms an active material layer-provided portion obtained by laminating a portion provided with a positive active material layer and a portion provided with an negative active material and one of the both ends of the active material layer-provided portion as viewed from the broad with surface forms a positive electrode substrate exposed portion in which no positive active material layer is provided but the exposed portions of positive electrode substrates are laminated on each other. The other end forms a negative electrode substrate exposed portion in which no negative active material layer is provided but the exposed portions of negative electrode substrates are laminated on each other. An insulation outer body corresponding to the shape of the electrode assembly is disposed to isolate the electrode assembly from the battery case. The electrode assembly is inserted from the opening formed at the upper end of the battery case into the battery case in a lateral direction in which the above positive electrode collector and negative electrode collector are disposed extending from the upper end to the bottom at both ends of the broad width surface of the battery case and also disposed inside of the above outer body in the battery case to constitute a flat box-shaped electrode assembly insertion body in combination with the outer body. In the above electrode assembly insertion body, the thickness thereof at both ends in the above lateral direction is gradually decreased toward the bottom surface from upper end of the battery case.

According to the technologies disclosed in the above Patent Literature 2, the ability to insert the electrode assembly insertion body into the outer can is improved to a certain extent. However, the insulation sheet disclosed in the above Patent Literature 2 has a complicated shape and it is therefore troublesome to form the insulation sheet.

The present invention is developed to solve the problems of a conventional prismatic secondary battery as mentioned above. Accordingly, it is an object of the present invention to provide a prismatic sealed secondary battery which is superior in the ability to insert an electrode assembly insertion body into a battery outer can in the production process and is limited in the displacement and damage of an insulation member when the electrode assembly insertion body is inserted even if it is a prismatic sealed secondary battery provided with a metal battery outer can.

Solution to Problem

The above object is attained by a prismatic sealed secondary battery according to the present invention, the battery including an insulation member formed into a box form, an electrode assembly accommodated in the insulation member, and a metal prismatic outer body, wherein the insulation member has a bottomed box shape formed by a bottom surface, and two pairs of side surfaces, the bottomed box shape obtained by eliminating the upper surface from the surfaces of a hexahedron having an almost cuboid form and the width of at least a pair of side surfaces facing each other in the insulation member is smaller than the width of the electrode assembly facing the pair of side surfaces of the insulation member.

In the prismatic sealed secondary battery of the present invention, the clearance between the inside corner (hereinafter referred to as "R part") having a R-shape in the prismatic outer can and a corner formed by the fold of the insulation member is increased and therefore, the interference between the R-part of the prismatic outer can and the corner of the insulation member can be limited. For this, according to the prismatic secondary battery of the present invention, the insertion ability when the electrode assembly covered with the insulation member is inserted into the outer can is improved and therefore, a prismatic sealed secondary battery limited in the risks of insulation inferior caused by the displacement and damage of the insulation member when the electrode assembly is inserted into the outer can.

In addition, the prismatic sealed secondary battery of the present invention can be provided with an electrode assembly having a larger width than that of a conventional electrode assembly in the direction (longitudinal direction on the bottom surface of the prismatic outer body) of the width of the prismatic outer can, enabling the improvement of the capacity per battery volume. In the prismatic sealed secondary battery of the present invention, the insulation sheet may be either one made of one sheet or one made of a plurality of sheets.

Also, in the prismatic sealed secondary battery of the present invention, a structure in which the two pairs of side surfaces has a pair of side surfaces of small area side; and another pair of side surfaces of large area side, the width of the side surface of the small area side in the insulation member is smaller than the width of the electrode assembly facing the side surface of the small area side in the insulation member and the width of the side surface of the large area side in the insulation member is smaller than the width of the electrode assembly facing the side surface of the large area side in the insulation member. If the former structure is adopted, the battery can be provided with an electrode assembly having a larger thickness than a conventional electrode assembly in the direction (short side direction on the bottom surface of the thickness of the prismatic outer can) of the thickness of the prismatic outer can. If the latter structure is adopted, the battery can be provided with an electrode assembly having a larger thickness than a conventional electrode assembly in the direction (long side direction on the bottom surface of the thickness of the prismatic outer can) of the width of the prismatic outer can. Any of these structures can improve the capacity per battery volume.

Moreover, it is, of course, possible to adopt the structures of the both at the same time, ensuring that the interference between the R-part of the prismatic outer can and the corner of the insulation member can be limited and also, the above effect on the improvement of the capacity per battery volume is well produced.

In the prismatic sealed secondary battery of the present invention, the insulation member has an almost octagonal form as a sectional shape of the insulation member along a plane parallel to the bottom surface of the insulation member and four corners among eight corners constituting the almost octagonal shape may be designed to be corners newly created by arranging the electrode assembly inside of the bottomed box shape. Also, the insulation member has an almost dodecagonal form as a sectional shape along a plane parallel to the bottom surface of the insulation member and eight corners among twelve corners constituting the almost dodecagonal shape may be designed to be corners newly created by arranging the electrode inside of the bottomed box shape. The structures "almost octagonal shape" and "almost dodecagonal shape" are unnecessarily a precise octagonal shape and dodecagonal shape but are used in a sense implying partially distorted or warped shapes. For example, there is the case where the insulation member is put into a distorted condition when the rib installed on the current collector is brought into contact with the insulation member.

In the prismatic sealed secondary battery of the present invention, the sectional shape of the insulation member along a plane parallel to the bottom surface of the insulation member is not limited to an almost octagonal shape and dodecagonal shape. It is because, when the rib installed on the current collector is brought into contact with the insulation member, there is the case where the sectional shape of the insulation member along the plane parallel to the bottom surface of the insulation member has a shape other than an almost octagonal or dodecagonal shape.

The insulation member in the prismatic sealed secondary battery of the present invention is slightly deformed in the situation where the electrode assembly is covered therewith as compared with a shape which is the original shape of the insulation member and is obtained by forming using only the insulation body. When the width of the side surface of the small area side in the insulation member or the width of the side surface of the large area side in the insulation member is smaller than the corresponding width of the electrode assembly, the sectional shape of the electrode assembly along a plane parallel to the bottom surface of the electrode assembly is deformed into an almost octagonal shape because four corners are newly created from the original rectangular form. Similarly, when the width of the side surface of the small area side in the insulation member or the width of the side surface of the large area side in the insulation member is smaller than the corresponding width of the electrode assembly, the sectional shape of the electrode assembly along a plane parallel to the bottom surface of the electrode assembly is deformed into an almost dodecagonal shape. When any of these structures is adopted, the interference between the R-part of the prismatic outer can and the corner of the insulation member can be limited and also, the above effect of the present invention is well produced.

Also, in the prismatic sealed secondary battery, the insulation member may use a material obtained by folding a flexible insulation sheet at the position corresponding to the edge of the hexahedron to form.

Also, in that case, it is preferable to provide perforations or thin-wall parts to the folded part in advance to easily fold the insulation sheet. In this case, perforations or thin-wall parts may be formed in advance on the parts corresponding to the four corners existing before the deformation of the insulation member without forming perforations or thin-wall parts on the parts corresponding to four or eight corners newly created in the almost octagonal or dodecagonal sectional shape along a plane parallel to the bottom surface in the insulation sheet.

Also, in the prismatic sealed secondary battery of the present invention, the insulation member preferably has a structure in which the overlapped parts of the insulation sheets are stuck to each other.

When the overlapped parts of the insulation sheets are stuck to each other, the shape of the insulation sheet is stabilized and therefore, the interference between the R-part of the prismatic outer can and the corner of the insulation member can be limited and therefore, the above effect of the present invention is well produced. As the method of sticking the overlapped parts of the insulation sheets, a thermal welding method is preferable because the overlapped parts can be stuck in a short time and also, this method is suitable for mass production.

Also, in the present invention, it is preferable to satisfy the following relation when the length of the bottom surface of the insulation member is E and the width of the side surface of the small area side is B:

E≥B and it is more preferable to satisfy the following relation when the thickness of the electrode assembly facing the side surface of the small area side is F:

0.8≤E/F<1.0, and 0.8≤B/F<1.0.

When such relations are fulfilled, the box-shaped insulation member is easily manufactured and also, the electrode assembly is easily inserted into the formed insulation member, so that the interference between the R-part of the prismatic outer can and the corner of the insulation member can be easily limited and therefore, the above effect of the present invention is well produced.

In the prismatic sealed secondary battery of the present invention, the electrode assembly is a flat electrode assembly in which a positive electrode plate and an negative electrode plate are laminated or wound with a separator being interposed therebetween, is provided with a positive electrode exposed portion formed at one end thereof and a negative electrode exposed portion formed on the other end, and is accommodated in the insulation member such that the positive electrode exposed portion is positioned on one end side in the longitudinal direction of the bottom surface of the insulation member and the negative electrode exposed portion is positioned on the other end side.

According to the prismatic sealed secondary battery of the present invention, the effect of the present invention can be produced even though it has a high capacity and high output.

Also, the object of the present invention can be attained by a method for producing a prismatic sealed secondary battery, the method including:

a step (A) of covering an electrode assembly with an insulation member formed into a box form; and a step (B) of inserting the electrode assembly covered with the insulation member into a metal prismatic outer body, wherein;

the insulation member is formed of a flexible material;

the section of the insulation member along a plane parallel to the bottom surface of the insulation member has an almost rectangular shape under the condition that the electrode assembly is not inserted or under the condition that the insulation member is fabricated without disposing the electrode assembly therein; and the electrode assembly is inserted into the insulation member or the insulation member is disposed inside thereof to fabricate to thereby deform the shape of the insulation member so as to deform the shape of the section of the insulation member along a plane parallel to the bottom surface of the insulation member.

According to the method for producing a prismatic sealed secondary battery according to the present invention, the risks of insulation inferior caused by the displacement or damage of the insulation member when the electrode assembly covered with the insulation member is inserted into the prismatic outer can, enabling easy production of a prismatic sealed secondary battery improved in reliability.

Also, in the method for producing a prismatic sealed secondary battery according to the present invention, an insulation member formed by a bottom surface, and two pairs of side surfaces in which the width of at least a pair of side surfaces facing each other is smaller than the width of the electrode assembly facing the pair of side surfaces under the condition that the electrode assembly is not inserted or under the condition that the insulation member is fabricated without disposing the electrode assembly therein may be used as the above insulation member. At this time, as the insulation member to be used, an insulation member in which the two pairs of side surfaces has a pair of side surfaces of small area side, and another pair of side surfaces of large area side, the width of the side surfaces of the small area side in the insulation member is smaller than the width of the electrode assembly facing the side surfaces of the small area side under the condition that the electrode assembly is not inserted or under the condition that the insulation member is fabricated without disposing the electrode assembly therein may be used, and further, an insulation member in which the width of the side surfaces of the large area side in the insulation member is smaller than the width of the electrode assembly facing the side surfaces of the large area side under the condition that the electrode assembly is not inserted or under the condition that the insulation member is fabricated without disposing the electrode assembly therein may be used.

In these methods for producing a prismatic sealed secondary battery according to the present invention, the sectional shape of the insulation member along a plane parallel to the bottom surface of the insulation member is preferably deformed into an almost octagonal shape or dodecagonal shape from an almost rectangular shape.

In the method for producing a prismatic sealed secondary battery according to the present invention, the insulation member is slightly deformed in the situation where the electrode assembly is covered therewith as compared with a shape which is the original shape of the insulation member and is obtained by forming using only the insulation body. When the width of the side surface of the small area side in the insulation member or the width of the side surface of the large area side in the insulation member is smaller than the corresponding width of the electrode assembly, the sectional shape of the electrode assembly along a plane parallel to the bottom surface of the electrode assembly is deformed into an almost octagonal shape because four corners are newly created from the original rectangular form. Similarly, when the width of the side surface of the small area side in the insulation member or the width of the side surface of the large area side in the insulation member is smaller than the corresponding width of the electrode assembly, the sectional shape along a plane parallel to the bottom surface of the electrode assembly is deformed into an almost dodecagonal shape. When any of these structures is adopted, a prismatic sealed battery can be produced under the condition that the interference between the R-part of the prismatic outer can and the corner of the insulation member can be easily limited.

Also, the method for producing a prismatic sealed secondary battery according to the present invention preferably further involves, in the step (A) above, a step (C) of forming the insulation member from a flexible insulation sheet. In this case, the method preferably further involves, in the step (C) above, a step (D) of cutting the above insulation sheet into a predetermined shape and a step (E) of folding the insulation sheet at the position corresponding to the hedge of the hexahedron. Also, the method preferably further involves a step (F) of providing perforations or thin-wall parts to the folded part of the insulation sheet in advance prior to the step (E). Moreover, the method preferably further involves a step (G) of inserting the electrode into a space formed by the folded insulation sheet and subsequently, a step (H) of sticking the folded insulation sheet at the folded part after the step (E).

When these steps are involved, a prismatic sealed secondary battery of the present invention which can produce the above effect can be manufactured.

DESCRIPTION OF EMBODIMENTS

An embodiment of the present invention will be explained with reference to the drawings. The embodiments shown below show examples of a prismatic sealed secondary battery provided with a flat winding electrode assembly as a prismatic nonaqueous electrolyte secondary battery to embody the technical spirit of the present invention and are not intended to be limiting of the present invention. The present invention may be equally applied to various modifications without departing from the technical spirit shown in the scope of the claim of the present invention.

Figure 1A:
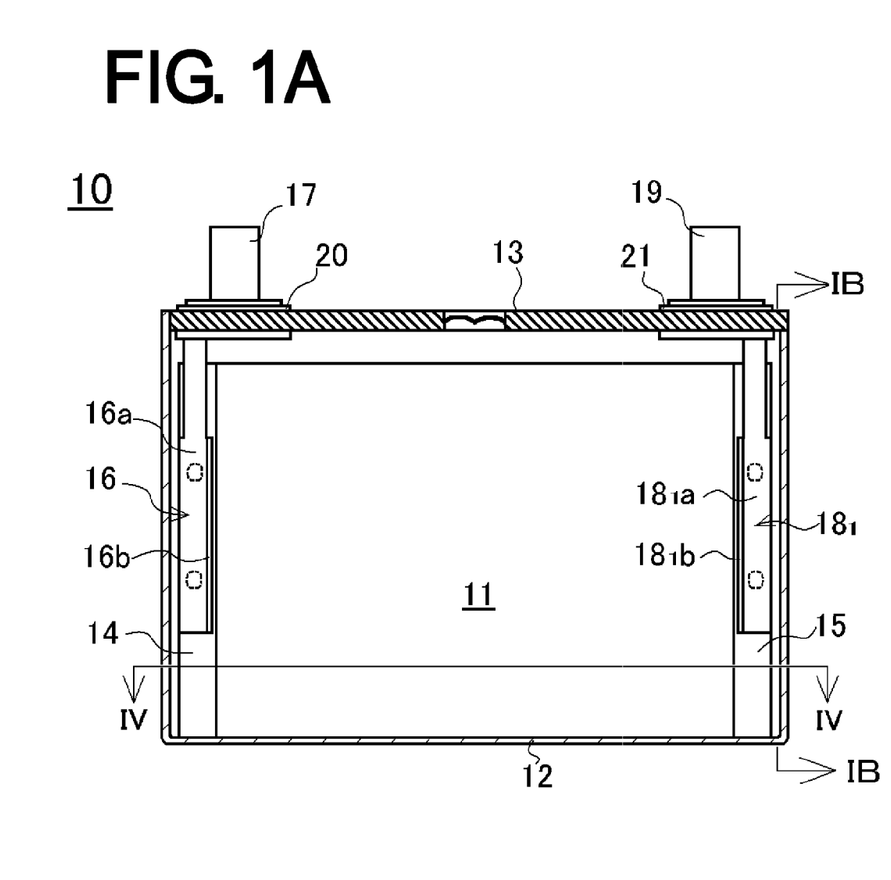
FIG. 1A is a plan view showing a prismatic sealed secondary battery in the present embodiment by illustrating a see-through image of a battery outer can and an insulation member and FIG. 1B is a sectional view along the line IB-IB of FIG. 1A.
Figure 1B:
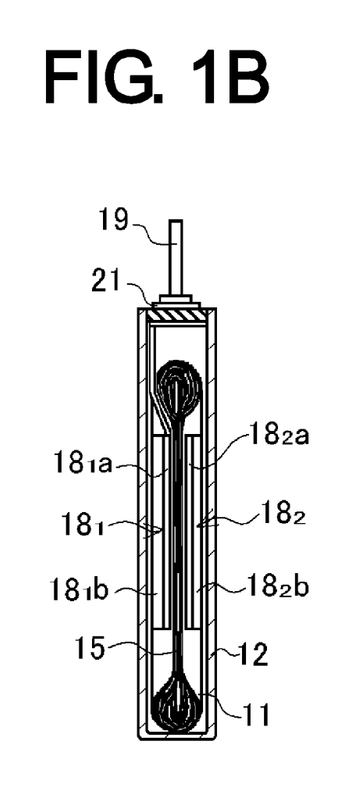

First, a prismatic nonaqueous secondary battery according to this embodiment will be explained with reference to the drawings. This prismatic nonaqueous electrolyte secondary battery 10 is obtained in the following manner: a flat winding electrode assembly 11 prepared by winding a positive electrode plate and an negative electrode plate with a separator (not shown) being interposed therebetween is covered with an insulation member $30_1$ and is then accommodated in a prismatic battery outer can 12 and then, the battery outer can 12 is sealed by a sealing plate 13. In FIGS. 1A and 1B, the illustration of the insulation member $30_1$ is omitted.

The positive electrode plate is manufactured by applying a positive active material compound to each surface of an aluminum foil used as a positive electrode substrate so as to form a positive electrode exposed portion 14 in which a band-shaped aluminum foil is exposed and by drying and then rolling the obtained material. The negative electrode plate is manufactured by applying a negative active material compound to each surface of a copper foil used as a negative electrode substrate so as to form a negative electrode exposed portion 15 in which a band-shaped copper foil is exposed and by drying and then rolling the obtained material. Then, the flat winding electrode assembly 11 is manufactured by winding the positive electrode plate and the negative electrode plate flatly with a polyethylene porous separator (not shown) being interposed therebetween under the condition that the positive electrode exposed portion 14 and the negative electrode exposed portion 15 are displaced such that the positive electrode exposed portion 14 and the negative electrode exposed portion 15 are not overlapped on the active material compound coated portions of the electrodes facing these exposed portions respectively and that the positive electrode exposed portion 14 is positioned at one end in the direction of the winding axis and the negative electrode exposed portion 15 is positioned at the other end.

Among these parts, the positive electrode exposed portion 14 is connected with a positive electrode terminal 17 via a positive electrode collector 16 and the negative electrode exposed portion 15 is connected with an negative electrode terminal 19 via an negative electrode collector $18_1$. In this case, the positive electrode collector 16 is provided with a body part 16a and a rib 16b which is folded almost vertically from the body part 16a and the body part 16a is bonded with a positive electrode collector receiving member (not shown)

by resistance welding with the positive electrode exposed portion 14 being interposed therebetween. Similarly, the negative electrode collector 18₁ is provided with a body part 18₁a and a rib 18₁b which is folded almost vertically from the body part 18₁a, an negative electrode collector receiving member 18₂ is provided with a body part 18₂a and a rib 18₂b which is folded almost vertically from this body part 18₂a, and the body part 18₁a of the negative electrode collector 18₁ is bonded with a body part 18₂a of an negative electrode collector receiving member 18₂ by resistance welding with the negative electrode exposed portion 15 being interposed therebetween. In this case, the dotted and circular mark part in FIG. 1A is the resistance-welded position.

Also, the positive electrode terminal 17 and the negative electrode terminal 19 are secured to the sealing plate 13 through the insulation members 20 and 21 respectively. This prismatic nonaqueous secondary battery 10 is manufactured by inserting the flat winding electrode assembly 11 into the metal prismatic battery outer can 12, then by bonding the sealing plate 13 to the opening of the battery outer can 12 by laser welding, and then by injecting a nonaqueous electrolyte from an electrolyte pour hole (not shown), and by sealing up the electrolyte pour hole.

Here, the specific structures of the flat winding electrode assembly 11 and insulation member 30₁ in the aqueous nonaqueous electrolyte secondary battery 10 and a method of covering the flat winding electrode assembly 11 with the insulation member 30₁ will be explained.

<Production of a Positive Electrode Plate>

The positive electrode plate was manufactured in the following manner. First, 94% by mass of lithium cobaltate (LiCoO₂) used as a positive active material, 3% by mass of a carbon powder such as acetylene black or graphite, and 3% by mass of a binder made of polyvinylidene fluoride (PVdF) were mixed. An organic solvent made of N-methyl-2-pyrrolidone (NMP) was added to the obtained mixture, which was then kneaded to obtain a positive active material compound slurry. Then, a positive electrode substrate made of an aluminum foil (for example, one having a thickness of 20 μm) was prepared and the positive active material compound slurry produced in the above manner was uniformly applied to each of the positive electrode substrate to coat a positive active material compound layer. At this time, the positive active material compound slurry was applied to one of the positive active material compound layers so as to form a non-coated portion (positive electrode exposed portion 14) coated with no positive active material compound slurry and having a predetermined width (here, 12 mm was adopted) along the edge of the positive electrode substrate. After that, the positive electrode substrate on which the positive active material compound layer was formed was allowed to pass through a drier to dry by removing NMP needed in the production of the slurry. After the drying, the dried positive electrode substrate was rolled by a roll press machine until the thickness the positive electrode substrate was reduced to 0.06 mm to produce a positive electrode plate. The positive electrode plate produced in this manner was cut into a strip shape having a width of 95 mm to obtain a positive electrode plate provided with a positive electrode exposed portion 14 made of a band-shaped aluminum having a width of 10 mm.

<Production of a Negative Electrode Plate>

The negative electrode plate was manufactured in the following manner. First, 98% by mass of a natural graphite powder used as a negative active material, and 1% by mass of carboxymethyl cellulose (CMC) and 1% by mass of styrene-butadiene rubber (SBR) used as a binder were mixed and then, water was added to the mixture, followed by kneading to obtain a negative active material compound slurry. Then, an negative electrode substrate made of a copper foil (for example, one having a thickness of 12 μm) was prepared and the negative active material compound slurry produced in the above manner was uniformly applied to each of the negative electrode substrate to form an negative active material compound layer. At this time, the negative active material compound slurry was applied to one of the negative active material compound layer so as to form a non-coated portion (negative electrode exposed portion 15) coated with no negative active material compound slurry and having a predetermined width (here, 10 mm was adopted) along the edge of the negative electrode substrate. After that, the negative electrode substrate on which the negative active material compound layer was formed was allowed to pass through a drier to dry. After the drying, the dried negative electrode substrate was rolled by a roll press machine until the thickness of the positive electrode substrate was reduced to 0.05 mm to produce a negative electrode plate. The negative electrode plate produced in this manner was cut into a strip shape having a width of 100 mm to obtain a negative electrode plate provided with a band-shaped negative electrode exposed portion 15 having a width of 8 mm.

<Production of a Flat Winding Electrode Assembly>

The positive electrode plate and negative electrode plate obtained in the above manner were wound with a polyethylene porous separator (thickness: 0.022 mm, width: 100 mm) being interposed therebetween under the condition that the positive electrode exposed portion and the negative electrode exposed portion are displaced such that the positive electrode exposed portion and the negative electrode exposed portion were not overlapped on the active material compound coated portions of the electrodes facing these substrate exposed portions respectively to produce a winding electrode assembly. At this time, the winding electrode assembly was formed so as to coat the outermost periphery thereof with the porous separator.

Then, the winding electrode assembly was pressed into a flat shape and then, the aluminum positive electrode collector 16 and the positive electrode collector receiving member (not shown) were attached to the positive electrode exposed portion 14 and the copper negative electrode collector 18₁ and the negative electrode collector receiving member 18₂ were attached to the negative electrode exposed portion 15 by resistance welding to manufacture a flat winding electrode assembly 11 of the embodiment. The dimension of the flat winding electrode assembly 11 was as follows: the width (length from the end of the positive electrode exposed portion side to the end of the negative electrode exposed portion side) was designed to be 107 mm and the thickness (thickness of the portion where the portion in which the positive active material compound layer of the positive electrode plate is formed and the portion in which the negative active material compound layer of the negative electrode plate is formed are laminated with the separator being interposed therebetween) was designed to be 11.6 mm.

Here, the width (length from the end of the positive electrode exposed portion side to the end of the negative electrode exposed portion side) of the flat winding electrode assembly 11 corresponds to the width of the electrode facing the side surface of the large are side in the insulation member. Also, the thickness (thickness of the portion where the portion in which the positive active material compound layer of the positive electrode plate is formed and the portion in which the negative active material compound layer of the negative electrode plate is formed are laminated with the separator being interposed therebetween) of the flat winding electrode assembly 11 corresponds to the width of the electrode assembly facing the small area side in the insulation member.

<Production of an Insulation Member>

Figure 2:
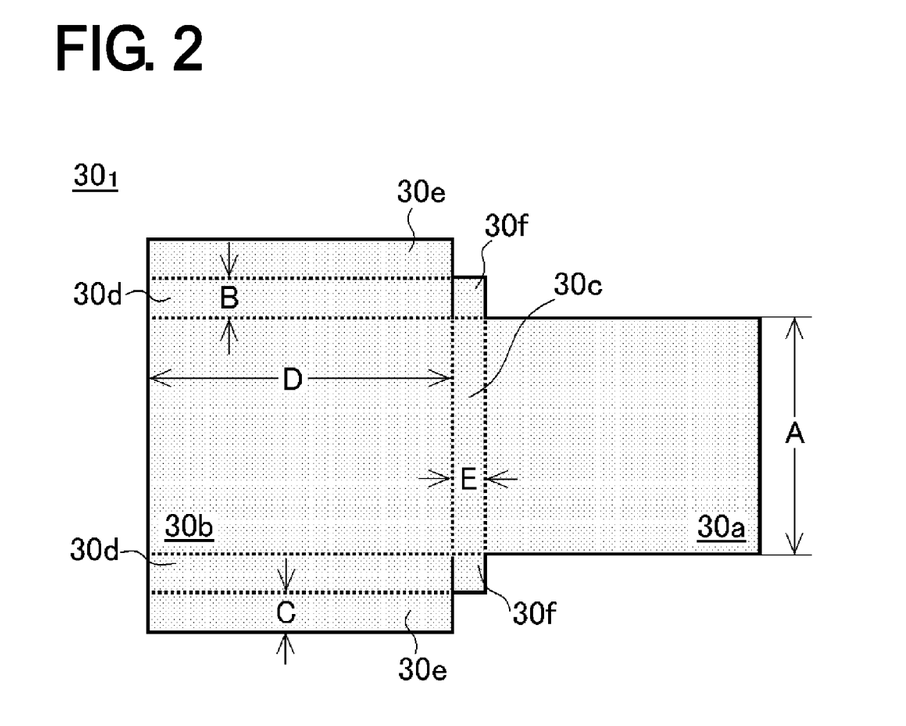
FIG. 2 is a developed view of an insulation member used in a prismatic sealed secondary battery in the present embodiment.

A polypropylene sheet having a thickness of 150 μm was used as the material of the insulation member $30_1$ to be used in the prismatic nonaqueous electrolyte secondary battery in this embodiment. This sheet was cut into a shape provided with, as shown in FIG. 2, a front surface 30a, a back surface 30b, a bottom surface 30c, a pair of side surfaces 30d, a pair of first folded parts 30e, and a pair of second folded parts 30f having a small tongue piece form and then, perforations were formed at the portion shown by the dotted lines to produce an insulation member $30_1$.

The dimension of the insulation member $30_1$ before formed, that is, in a sheet state is as follows: when the widths of the front surface 30a and back surface 30b are respectively A, the width of the side surface 30d is B, the width of the first folded part 30e is C, the height (length from the bottom surface to the opening) is D, and the length of the short side of the bottom surface 30c is E, A=106.7 mm, B=10.6 mm, C=8 mm, D=86 mm, and E=10.6 mm.

<Covering of a Flat Winding Electrode Assembly>

Figure 3:
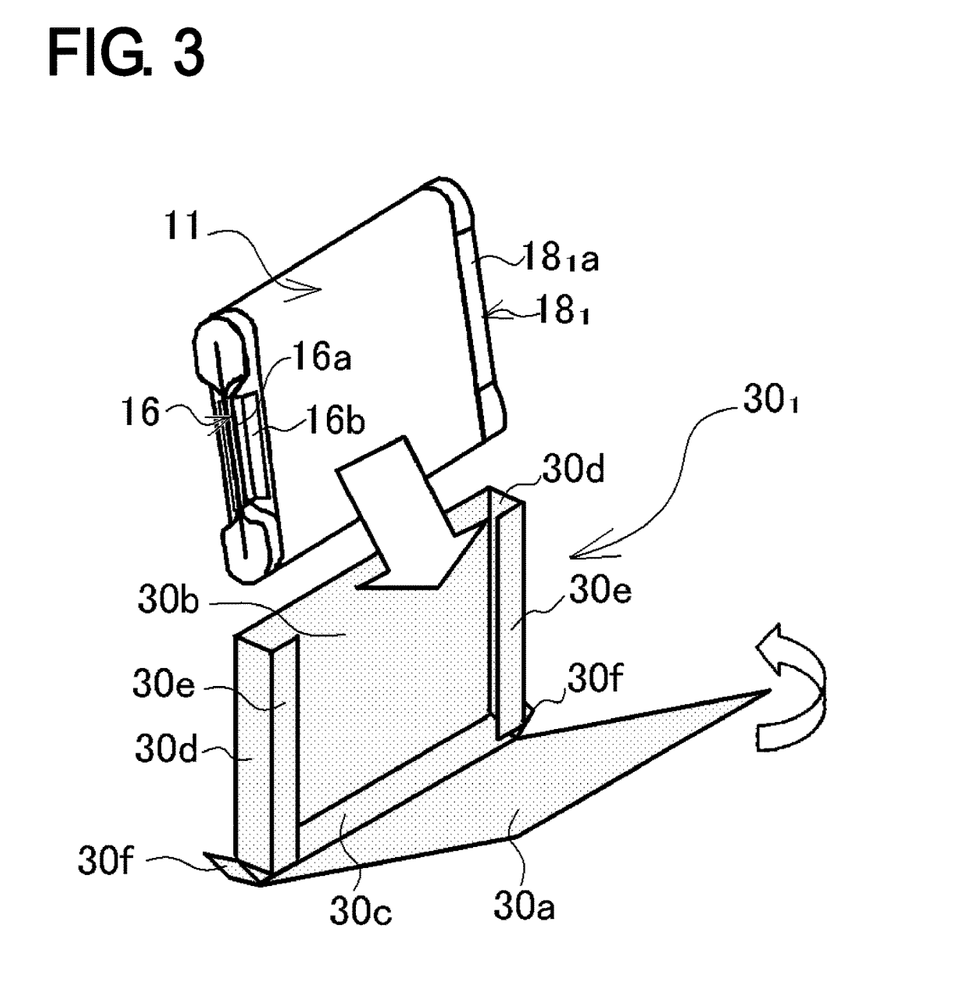
FIG. 3 is a perspective view for explaining a structure of a combination of a flat electrode assembly and an insulation member in a prismatic sealed secondary battery in the present embodiment.

The insulation member $30_1$ was folded in a mountain fold shape along all the perforations and the flat winding electrode assembly 11 was, as shown in FIG. 3, inserted into a space formed in the insulation member $30_1$ in such a manner that the winding axis of the flat winding electrode assembly 11 was oriented in a lateral direction and that the positive electrode collector 16 and the negative electrode collector $18_1$ were respectively disposed opposite to the side surface 30d of the insulation member $30_1$. Then, the part where the first folded part 30e was overlapped on the front surface 30a was bonded with each other by thermal fusion to covered the flat winding electrode assembly 11 with the insulation member $30_1$ formed in a box shape.

Here, attention is focused on the dimension of the flat winding electrode assembly 11 and the dimension of the insulation member $30_1$ having a box shape. When, first, the insulation member $30_1$ having a box shape is independently formed into a box shape, it forms a bottomed box shape which is a shape obtained by eliminating one surface (surface facing the bottom surface 30c) from a hexahedron which is a cuboid form similarly to an insulation member used in a conventional prismatic sealed secondary battery. Specifically, the thickness (distance from the front surface 30a to the back surface 30b) of the insulation member $30_1$ is 10.6 mm (=B, E) which accords to the length of the short side of the bottom surface 30c and to the width of the back surface 30d. The width of the insulation member $30_1$ is 106.7 mm (=A) which accords to that of the front surface 30a and that of the back surface 30b and the height of the insulation member $30_1$ is 86 mm (=D). The dimensions of this insulation member $30_1$ are the same as those of the original insulation member $30_1$ having a box shape. Also, in this bottomed box shape, the length of the short side of the opening is equal to the length of the short side of the bottom surface.

The dimension of the flat winding electrode assembly 11 is as follows: the width is 107 mm and the thickness is 11.6 mm as mentioned above. Therefore, as compared with the dimensions of the original boxy-shaped insulation member $30_1$, the width and thickness of the flat winding electrode assembly 11 are both larger than original dimensions of the insulation member $30_1$. Because the insulation member $30_1$ is formed of a flexible polypropylene sheet, the flat winding electrode assembly 11 can be covered therewith by folding the insulation member $30_1$. When the flat winding electrode assembly 11 is covered, the shape of the insulation member $30_1$ is slightly changed from the original box shape (shape obtained by eliminating one surface from a hexahedron which is a cuboid form). The section along a plane parallel to the bottom surface is deformed from a rectangular form which is the original box form corresponding to that of the conventional example shown in FIG. 4C.

Figure 4A:
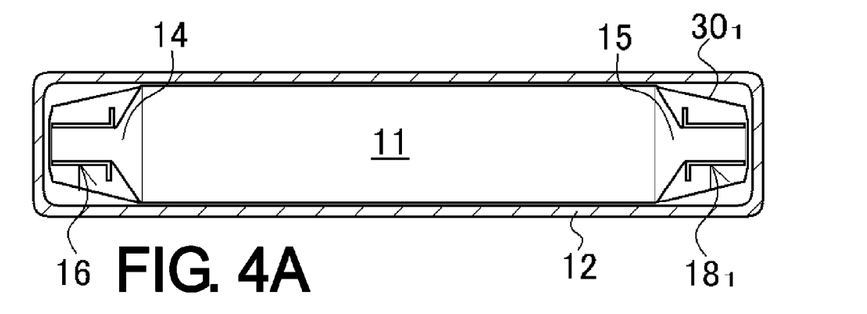
FIG. 4A is a sectional and typical view showing an insulation member of the present embodiment corresponding to the section along the line IV-IV of FIG. 1A together with an outer can.

Specifically, when the width B of the side surface 30d of the small area side of the insulation member $30_1$ is smaller than the thickness of the flat winding electrode assembly 11 and the width A of each of the side surfaces 30a and 30b of the large area side in the insulation member $30_1$ is smaller than the width of the flat winding electrode assembly 11, the section along a plane parallel to the bottom surface form an almost dodecagonal shape because eight corners are newly created as shown FIG. 4A.

Figure 4B:
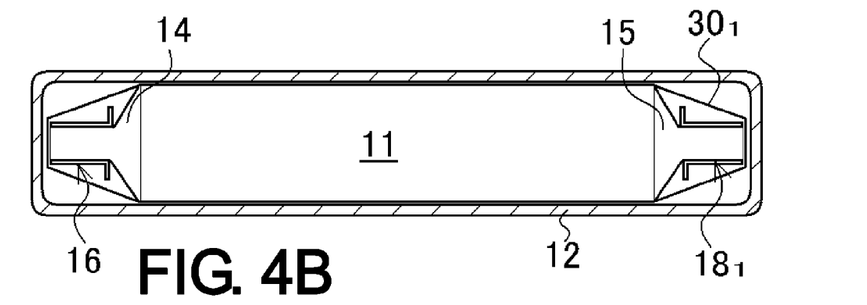
FIG. 4B is a sectional and typical view of the same part in a first modification.
Figure 4C:
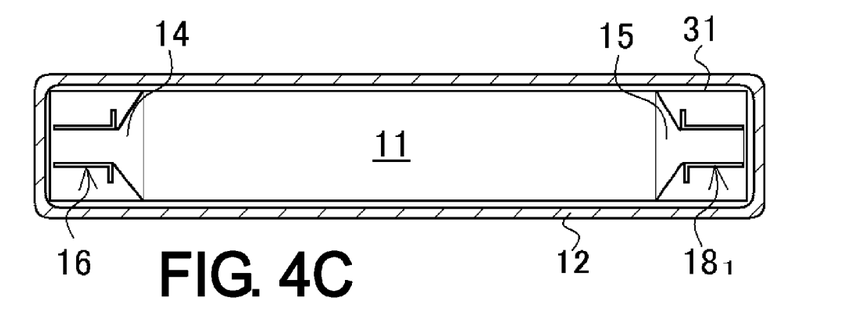
FIG. 4C is a sectional and typical view of the same part in a conventional example.

Also, when only either one of the width B of the side surface 30d of the small area side in the insulation member $30_1$ and width A of each of the side surfaces 30a and 30b of the large area side in insulation member $30_1$ is smaller than the thickness (in the case of the width B) or width (in the case of the width A) of the flat winding electrode assembly 11, the section along a plane parallel to the bottom surface form an almost octagonal shape. FIG. 4B shows the section when the width A is not designed to be smaller than the width of the flat winding electrode assembly 11 and only the width B is designed to be smaller than the thickness of the flat winding electrode assembly 11 as a first modification.

However, the four or eight corners newly created are produced when the insulation member $30_1$ is folded in accordance with the shape of the flat winding electrode assembly 11. Therefore, unlike corners corresponding to the four corners of a rectangular shape which is the sectional shape of the original box shape to which fold lines are applied in advance, no clear fold line exists. Also, this fold line has such a level of clearness that disappears by pulling the flat winding electrode assembly 11 from the insulation member $30_1$. For this, the shapes described as an almost octagonal shape or dodecagonal shape does not mean that the outline forming these shapes is an exactly straight line, but may be a distorted line.

The number of corners newly created in the insulation member is 2 in each surface and a total of 4 on the side surfaces 30a and 30b of the large area side when the width B is designed to be smaller than the thickness of the flat winding electrode assembly 11, and is 2 in each surface and a total of 4 on the side surfaces 30d of the small area side when the width A is designed to be smaller than the width of the flat winding electrode assembly 11.

Specifically, when the sectional shape along a plane parallel to the bottom surface of the insulation member is an almost octagonal shape, the four corners newly created are disposed opposite to four boundary parts between the area having the maximum thickness and the area where the thickness is reduced in the flat winding electrode assembly 11. Also, when the width A is designed to be smaller than the width of the flat winding electrode assembly 11, the newly created four corners are disposed opposite to four corners existing at both ends of the flat winding electrode assembly 11 in the direction of the width of the flat winding electrode assembly 11.

When the sectional shape along a plane parallel to the bottom surface of the insulation member is an almost dodecagonal shape, the four corners among eight corners newly created are disposed opposite to four boundary parts between the area having the maximum thickness and the area where the thickness is reduced in the flat winding electrode assembly 11. Also, the reminder four corners are disposed opposite to four corners existing at both ends of the flat winding electrode assembly 11 in the direction of the width of the flat winding electrode assembly 11.

Also, it is undesirable that the difference between the dimension of the insulation member 30₁ having the original box shape and the dimension of the insulation member deformed by covering the flat winding electrode assembly 11 with the insulation member is excessively large or the angle of each of the newly created four or eight corners is excessively small. Therefore, the width B of the side surface 30*d* and the length E of the short side of the bottom surface 30*c* preferably satisfy the following relation when the thickness of the flat electrode 11 is F:

$0.8 \leq E/F < 1.0$, and $0.8 \leq B/F < 1.0$.

Also, it is considered that when the distance from the newly created corner to the side surface is L, the following formula is preferably satisfied:

$$\tan(0.1°) \leq (F-B)/L \leq \tan(5°).$$

In this case, the length of L in this embodiment is preferably 10 to 15 mm.

Among these conditions, the condition $0.8 \leq B/F < 1.0$ means that the width B of the side surface 30*d* of the small area side in the insulation member 30₁ is smaller than the width F of the corresponding side surface of the flat winding electrode assembly on the small area side. The effect of the present invention can be straightly shown by comparing the shape of the section of the bottom surface with that shown in FIG. 4C which corresponds to a conventional example. Specifically, because the insulation member 31 has a shape obtained by eliminating one surface from a hexahedron which is a cuboid form in the case of a conventional prismatic sealed secondary battery, the angles of the corners formed by the fold line in the insulation member 30₁ are each 90° and the section has a rectangular shape. For this, when the inside corner of the prismatic outer can 12 has an R-shape (hereinafter referred to as "R part"), the R part of the prismatic outer can interferes directly with the corner of the insulation member 31.

In the case of the prismatic sealed secondary battery according to this embodiment or first modification, on the other hand, the section has an almost octagonal shape or dodecagonal shape as mentioned above and therefore, the clearance between the corners formed by the fold line in the insulation member 30₁ and the R part of the prismatic outer can 12 is increased, which limits the interference between the R part of the prismatic outer can 12 and the corner of the insulation member.

Also, the prismatic sealed secondary battery in this embodiment and the first modification has such excellent effects that it is superior in the ability to insert the covered flat electrode assembly 11 into the outer can 12 and also restrains the risks of insulation inferior caused by the displacement or damage of the insulation member when the electrode covered with the insulation member is inserted into the prismatic outer can, because the width B of the side surface 30*d* of the insulation member 30₁ is smaller than the thickness F of the flat winding electrode assembly 11 even in the condition that the flat winding electrode assembly is covered therewith.

In addition, since the prismatic sealed secondary battery in this embodiment and the first modification is limited in the interference between the R part of the prismatic outer can 12 and the corner of the insulation member, an electrode assembly having a wider width than that in a conventional example can be inserted, ensuring that the battery capacity per battery volume can be improved.

The condition $0.8 \leq E/F < 1.0$ means that the width E of the short side of the bottom surface 30*c* of the insulation member 30₁ is smaller than the thickness F of the flat winding electrode assembly 11. Such a structure makes easy to insert the flat electrode assembly 11 coated with the insulation member 30₁ into the outer can 12.

In this case, the prismatic sealed secondary battery of the present invention is not substantially different in production method from a conventional prismatic sealed secondary battery except that a member having a specified dimension is used when the electrode body is covered with the insulation member as shown in the above embodiment or first modification. For this, the present invention can be practiced in prismatic sealed secondary batteries having a desired metal outer can as long as both the shape condition that the insulation member has a bottomed box shape obtained by eliminating one surface from the surfaces of a hexahedron having an almost cuboid shape and the dimensional condition that at least either one of the sizes of the insulation member in the direction of the thickness or width of the insulation member is smaller than that of the electrode are satisfied.

Also, in the above embodiment, one polypropylene sheet having a thickness of 150 μm is cut into a specified dimension and used as the insulation member 30₁. However, a desired material having flexibility and insulation ability may be used as the insulation member in the present invention. For example, a box material obtained by forming a resin into a box shape may be used and also, a box material made not only of polypropylene but also of polyethylene, polyphenylene, sulfide, polyether-ether-ketone, nylon, or the like may be used.

Also, it is preferable in the present invention to form, for example, perforations at a fold line in advance so that the insulation member is easily folded at the fold line as shown in the above embodiment or first modification. However, this is not always required to practice the present invention. Also, for example, a method in which a thin wall part may be used in place of the perforations.

Figure 5:
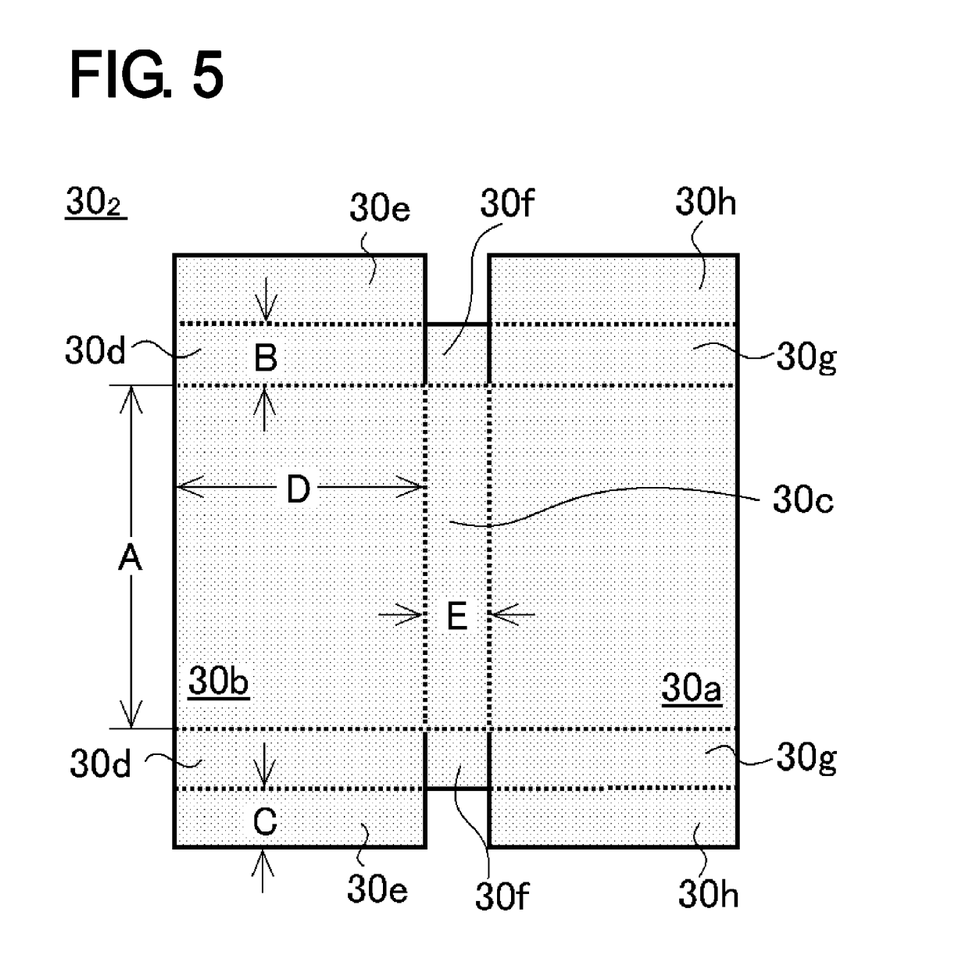
FIG. 5 is a developed view illustrating a second modification of an insulation member in the present invention.
Figure 6:
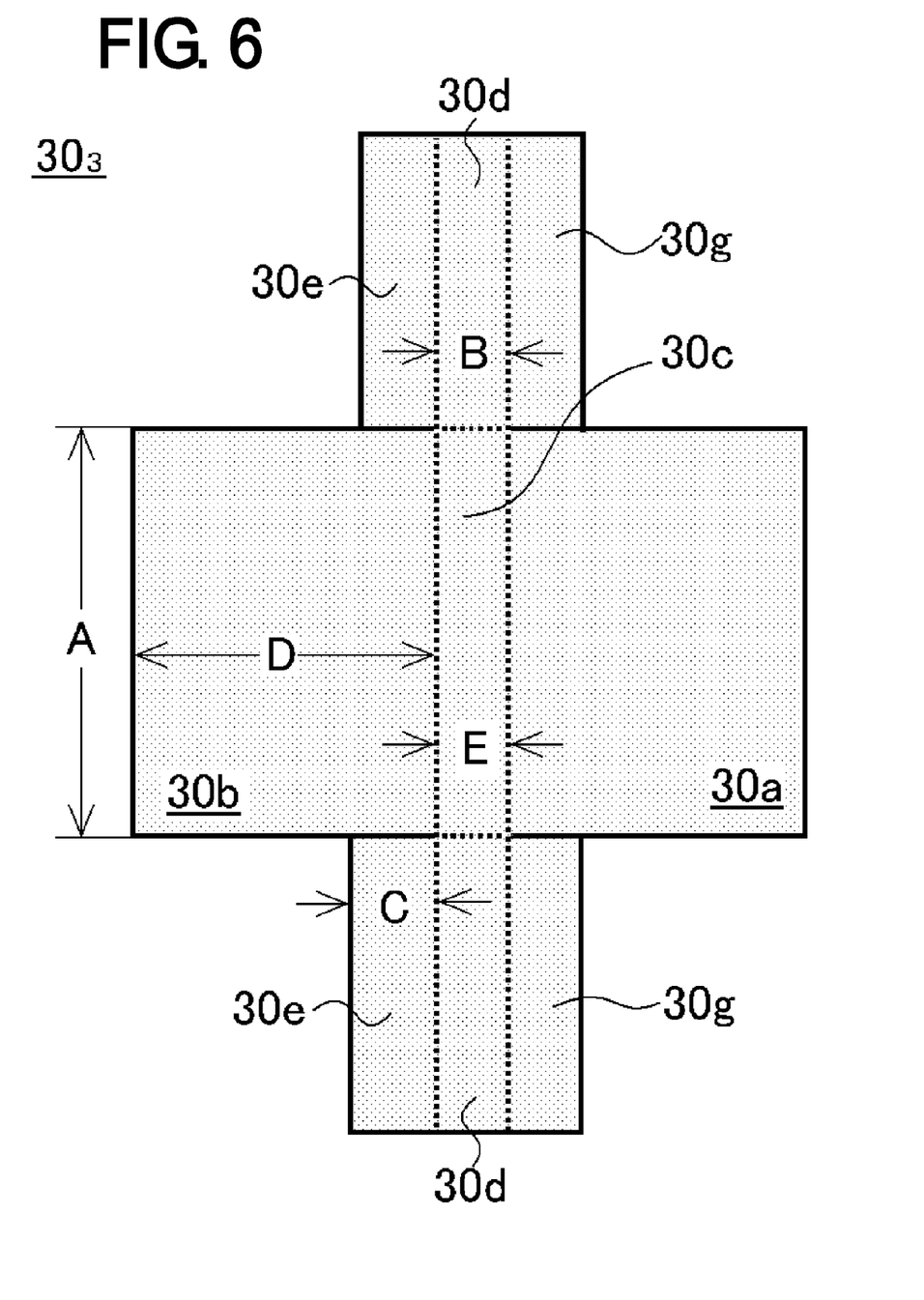
FIG. 6 is a developed view illustrating a third modification of an insulation member in the present invention.

In addition, any shape fulfilling the above requirements may be used as the above cut shape of the insulation sheet and therefore, the cut shape is not limited to the shape used in the embodiment as shown in FIG. 2. For example, the shapes like those of insulation members 30₂ and 30₃ as shown in FIGS. 5 and 6 are given as a second modification and a third modification respectively.

Though in the above embodiment, the insulation sheet in which the width B of the side surface 30*d* is equal to the length E of the short side of the bottom surface is used in the above embodiment, it is always necessary that the width B of the side surface 30*d* is not equal to the length E of the short side of the bottom surface 30*c* as long as the dimension is enough to form an insulation sheet into a box shape. However, when the length E of the short side of the bottom surface 30*c* is smaller than the width B of the side surface 30*d*, the front surface 30*a* or back surface 30*b* on the bottom surface side is deformed and expanded toward the outside, which arouses a fear that it makes difficult to insert the insulation member. Therefore, when an insulation member prepared by cutting down the insulation sheet into a box shape is used in the present invention, it is preferably cut down into such a dimension as to satisfy the formula, $E \geq B$ and it is more preferable to use such a shape that satisfies the formula $E=B$.

Also, the insulation member preferably has certain insulation ability and also has rigidity enough to maintain a box shape. Therefore, when the insulation member is formed from one polypropylene sheet as shown in the above embodiment, the thickness of a polypropylene sheet as the insulation sheet is preferably 80 μm or more and more preferably 100 μm or less.

When the thickness of the insulation sheet is excessive, on the other hand, this adversely affects battery capacity per volume and is therefore undesirable. When a polypropylene sheet is adopted as the insulation sheet, a polypropylene sheet has a thickness of, preferably, 500 μam or less and more preferably 300 μm or less.

The flat winding electrode assembly 11 is used as the electrode in the above embodiment. However, because the present invention can be practiced if the requirements as to the shape of the insulation member and the dimension of the insulation member when comparing with the electrode assembly are satisfied as mentioned above, no limitation is imposed on other structures of the electrode. Therefore, the present invention is, of course, applicable to a prismatic sealed secondary battery adopting no flat winding electrode assembly as the electrode assembly like, for example, prismatic secondary battery adopting a laminate electrode obtained by laminating a positive electrode plate and a negative electrode plate with a separator being interposed therebetween.

In the present invention, the width (width and thickness of the electrode assembly) of the electrode assembly facing the insulation member is a value when the electrode assembly is disposed in the insulation member.

REFERENCE SIGNS LIST

10: Prismatic battery
11: Flat winding electrode assembly
12: Battery outer body
13: Sealing plate
14: Positive electrode exposed portion
15: Negative electrode exposed portion
16: Positive electrode collector
16a: Body part
16b: Rib
17: Positive electrode terminal
$18_1$: Negative electrode collector
$18_1a$: Body part
$18_1b$: Rib
$18_2$: Negative electrode collector receiving member
$18_2a$: Body part
$18_2b$: Rib
19: Negative electrode terminal
20, 21: Insulation member
$30_1$ to $30_3$, 31: Insulation member

The invention claimed is:

1. A method for producing a prismatic sealed secondary battery, the method comprising:
a step (A) of covering an electrode assembly with an insulation member formed into a box form; and
a step (B) of inserting the electrode assembly covering with the insulation member into a metal prismatic outer body,
wherein in step (A)
the insulation member is formed of a flexible material,
the section of the insulation member along a plane parallel to the bottom surface of the insulation member has a substantially rectangular shape and includes a first straight part, a second straight part disposed substantially parallel to the first straight part, a third straight part and a fourth straight part disposed substantially parallel to the third straight part under the condition that the electrode assembly is not inserted or under the condition that the insulation member is fabricated without disposing the electrode assembly therein, and
the electrode assembly is inserted into the insulation member or the insulation member is fabricated after disposing the electrode assembly therein to thereby deform the shape of the insulation member so that a distance between the first straight part and the second straight part becomes wider as a result of the deforming the shape of the section of the insulation member along a plane parallel to the bottom surface of the insulation member.

2. The method for producing a prismatic sealed secondary battery according to claim 1,
wherein within step (A) the insulation member is used in which the insulation member is formed by a bottom surface, and two pairs of side surfaces, each width of at least a pair of side surfaces facing each other is smaller than the width of the electrode assembly facing the pair of side surfaces under the condition that the electrode assembly is not inserted or under the condition that the insulation member is fabricated without disposing the electrode assembly therein.

3. The method for producing a prismatic sealed secondary battery according to claim 2,
wherein within step (A) the insulation member is used in which the two pairs of side surfaces has a pair of side surfaces of small area side; and another pair of side surfaces of large area side, each width of the side surfaces of the small area side in the insulation member is smaller than the width of the electrode assembly facing the side surfaces of the small area side under the condition that the electrode assembly is not inserted or under the condition that the insulation member is fabricated without disposing the electrode assembly therein.

4. The method for producing a prismatic sealed secondary battery according to claim 2,
wherein within step (A) the insulation member is used in which the two pairs of side surfaces has a pair of side surfaces of small area side; and another pair of side surfaces of large area side, each width of the side surfaces of the large area side in the insulation member is smaller than the width of the electrode assembly facing the side surfaces of the large area side under the condition that the electrode assembly is not inserted or under the condition that the insulation member is fabricated without disposing the electrode assembly therein.

5. The method for producing a prismatic sealed secondary battery according to claim 1, wherein the sectional shape of the insulation member along a plane parallel to the bottom surface of the insulation member is deformed into a substantially octagonal shape or dodecagonal shape from the substantially rectangular shape.

6. The method for producing a prismatic sealed secondary battery according to claim 1, the method further comprising, in the step (A), a step (C) of forming the insulation member from a flexible insulation sheet.

7. The method for producing a prismatic sealed secondary battery according to claim 6, the method further comprising, in the step (C):
a step (D) of cutting the insulation sheet into a predetermined shape; and a step (E) of folding the insulation sheet at the position corresponding to the edge of a hexahedron.

8. The method for producing a prismatic sealed secondary battery according to claim 7, the method further comprising:
a step (F) of providing perforations or thin-wall parts to the folded part of the insulation sheet in advance prior to the step (E).

9. The method for producing a prismatic sealed secondary battery according to claim 7, the method further comprising, after the step (E):
a step (G) of inserting the electrode assembly into a space formed by the folded insulation sheet; and
subsequently, a step (H) of sticking the folded insulation sheet at an overlapped part.

10. The method for producing a prismatic sealed secondary battery according to claim 1, wherein the deformation of the shape of the insulation member due to the insertion or the disposition of the electrode assembly causes the first straight part and the second straight part to be bent.

11. The method for producing a prismatic sealed secondary battery according to claim 1, wherein the deformation of the shape of the insulation member due to the insertion or the disposition of the electrode assembly produces a first bent part and a third bent part in the first straight part and a second bent part and a fourth bent part in the second straight part.

12. The method for producing a prismatic sealed secondary battery according to claim 1, wherein
the section of the insulation member includes a first corner, a second corner, a third corner and a fourth corner prior to the deformation of the shape of the insulation member due to the insertion or the disposition of the electrode assembly, and
the deformation of the shape of the insulation member due to the insertion or the disposition of the electrode assembly causes each of interior angles of the first corner, the second corner, the third corner and the fourth corner greater.

13. The method for producing a prismatic sealed secondary battery according to claim 1, wherein
the width of the electrode assembly in a direction parallel to the third straight part and the fourth straight part after the insertion or the disposition of the electrode assembly therein is greater than the distance between the first straight part and the second straight part under the condition that the electrode assembly is not inserted or under the condition that the insulation member is fabricated without disposing the electrode assembly therein.

14. A method for producing a prismatic sealed secondary battery the method comprising
a step (A) of covering an electrode assembly with an insulation member formed into a box form; and
a step (B) of inserting the electrode assembly covering with the insulation member into a metal prismatic outer body, wherein
the electrode assembly has a flat shape, a first even surface and a second even surface,
the first even surface and the second even surface are disposed in substantially paralled to each other,
the insulation member is formed of a flexible material,
the section of the insulation member along a plane parallel to the bottom surface of the insulation member has a substantially rectangular shape under the condition that the electrode assembly is not inserted or under the condition that the insulation member is fabricated without disposing the electrode assembly therein, and
the electrode assembly is inserted into the insulation member or the insulation member is fabricated after disposing the electrode assembly therein to thereby deform the shape of the insulation member so as to deform the shape of the section of the insulation member along a plane parallel to the bottom surface of the insulation member as a result of contact between the insulation member and each of the first even surface and the second even surface, wherein
the section of the insulation member includes a first straight part, a second straight part disposed in substantially parallel to the first straight part, a third straight part and a fourth straight part disposed in substantially parallel to the third straight part under the condition that the electrode assembly is not inserted or under the condition that the insulation member is fabricated without disposing the electrode assembly therein, and
a distance between the first straight part and the second straight part increases as a result of the deformation of the shape of the section of the insulation member along a plane parallel to the bottom surface of the insulation member.

15. The method for producing a prismatic sealed secondary battery according to claim 14, wherein in the step (A), the first straight part and the first even surface are brought into contact with each other, and the second straight part and the second even surface are brought into contact with each other.

16. The method for producing a prismatic sealed secondary battery according to claim 15, wherein in the step (A), the deformation of the shape of the insulation member produces
a first bent part in the first straight part at a position opposed to an edge of the first even surface in a direction parallel to the first straight part,
a third bent part in the first straight part at a position opposed to the other edge of the first even surface in the direction parallel to the first straight part,
a second bent part in the second straight part at a position opposed to an edge of the second even surface in a direction parallel to the second straight part, and
a fourth bent part in the second straight part at a position opposed to the other edge of the second even surface in a direction parallel to the second straight part.

* * * * *